No. 832,262. PATENTED OCT. 2, 1906.
W. R. LAMB.
SEED COTTON CLEANING MACHINE.
APPLICATION FILED AUG. 4, 1905.

2 SHEETS—SHEET 1.

Witnesses
Inventor
W. R. Lamb.
By
Attorneys

No. 832,262. PATENTED OCT. 2, 1906.
W. R. LAMB.
SEED COTTON CLEANING MACHINE.
APPLICATION FILED AUG. 4, 1905.
2 SHEETS—SHEET 2.
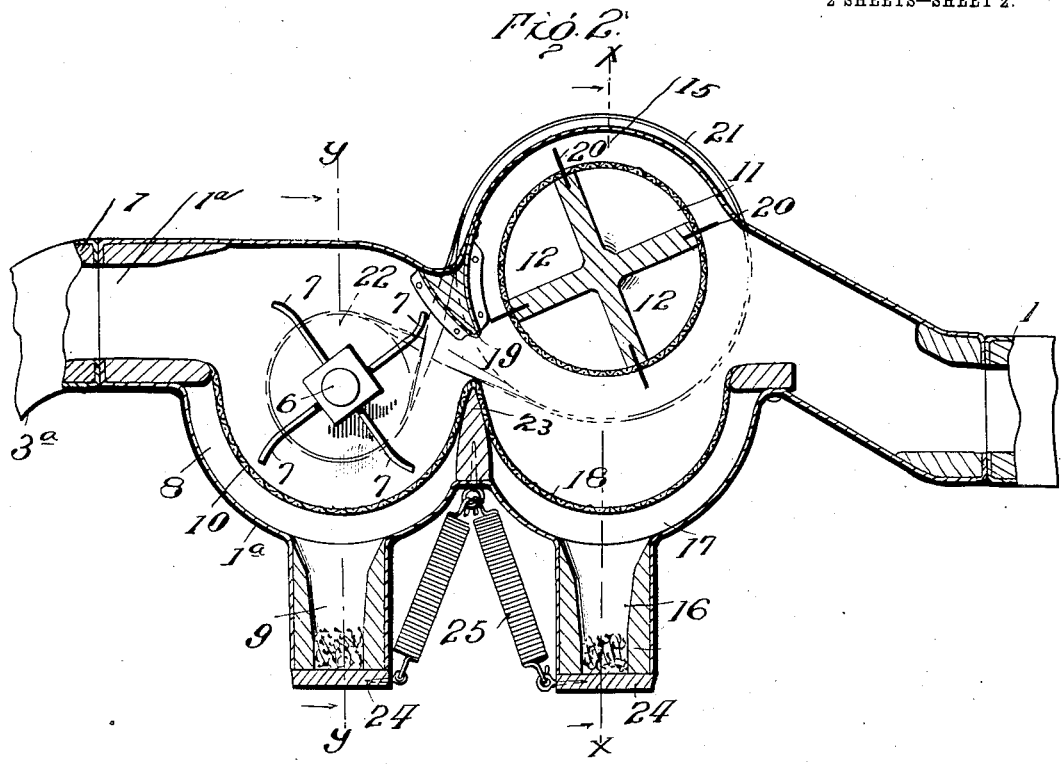
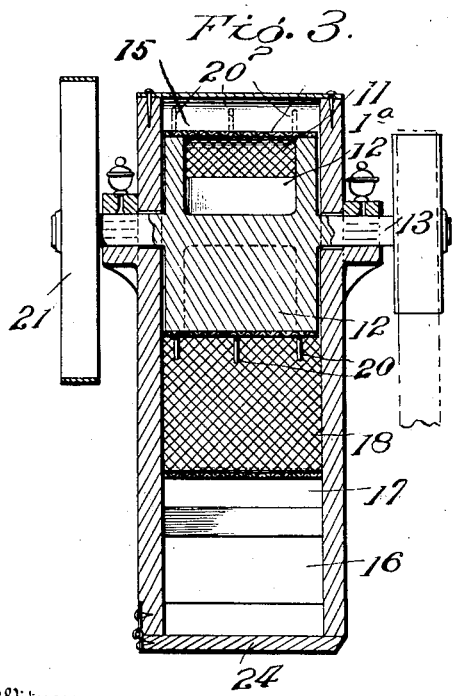
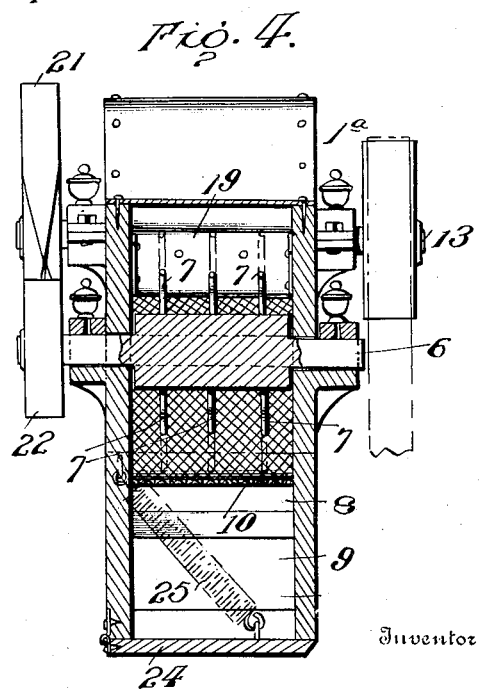
Witnesses
Inventor
W. R. Lamb.
By
Lacey, Attorneys

UNITED STATES PATENT OFFICE.

WILLIAM R. LAMB, OF BOWIE, TEXAS.

SEED-COTTON-CLEANING MACHINE.

No. 832,262.     Specification of Letters Patent.     Patented Oct. 2, 1906.

Application filed August 4, 1905. Serial No. 272,797.

*To all whom it may concern:*

Be it known that I, WILLIAM R. LAMB, a citizen of the United States, residing at Bowie, in the county of Montague and State of Texas, have invented certain new and useful Improvements in Seed-Cotton-Cleaning Machines, of which the following is a specification.

This invention consists of a machine or mechanism designed for use in connection with elevating and distributing systems of cotton-gins for beating, cleaning, and separating the dirt, grit, or other foreign matter from the seed-cotton as it passes from the wagon or seed-cotton house to the receivers and the feeders of the various cotton-gins.

The invention is applied to pneumatic elevating and distributing systems or those which involve the use of the suction conduit or tube for taking the cotton from the wagons or cotton-house and conveying the same to the feeders of the gins, the cleaning devices utilized in this invention being located in the length of the suction or exhaust-blast conduit, so as to facilitate removal of the foreign matter before the cotton reaches the gins, thereby decreasing the wear upon the gin-saws and other operating parts of the ginning mechanisms, conducing to long life of the ginning-machines and cleansing the cotton thoroughly before the same is ginned.

For a full description of the invention and the merits thereof and also to acquire a knowledge of the details of construction of the means for effecting the result reference is to be had to the following description and accompanying drawings, in which—

Figure 1:
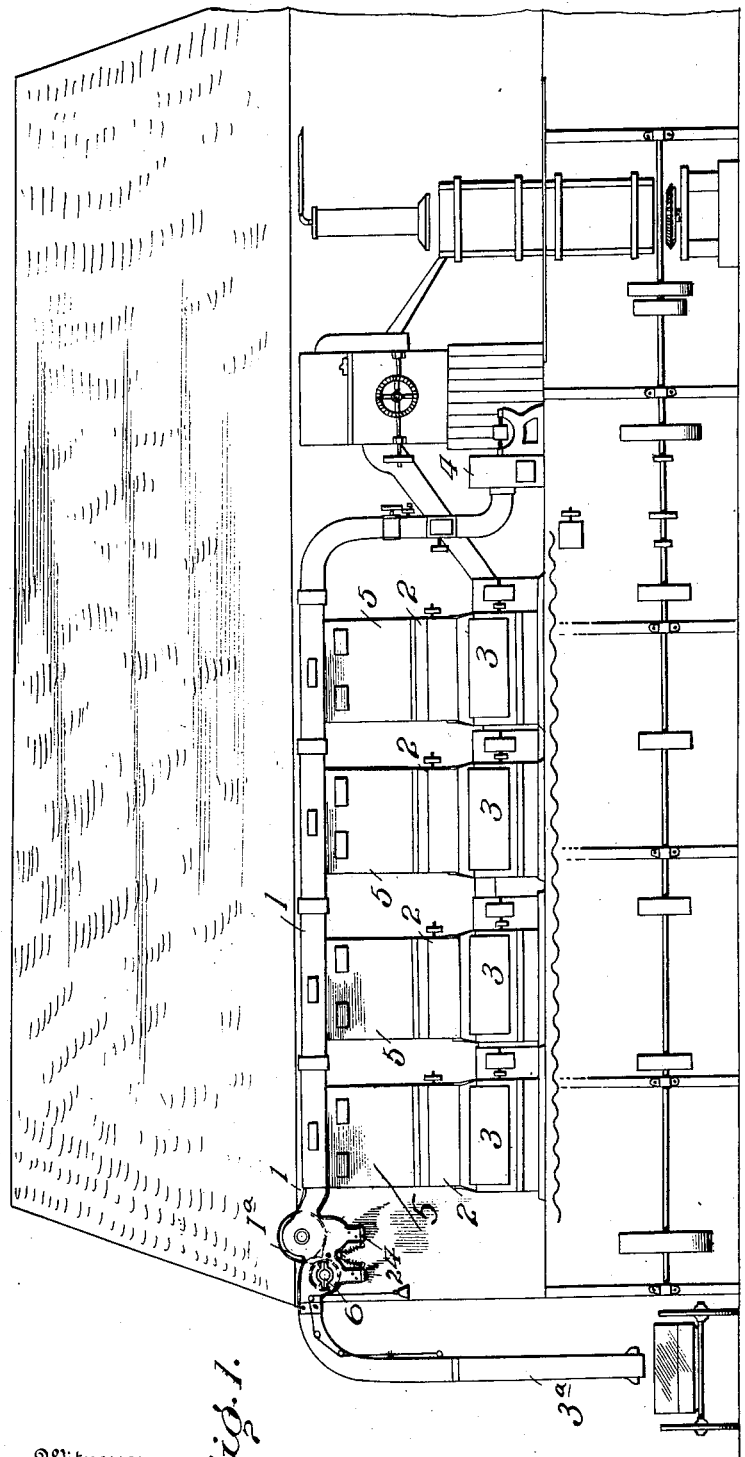
Figure 5:
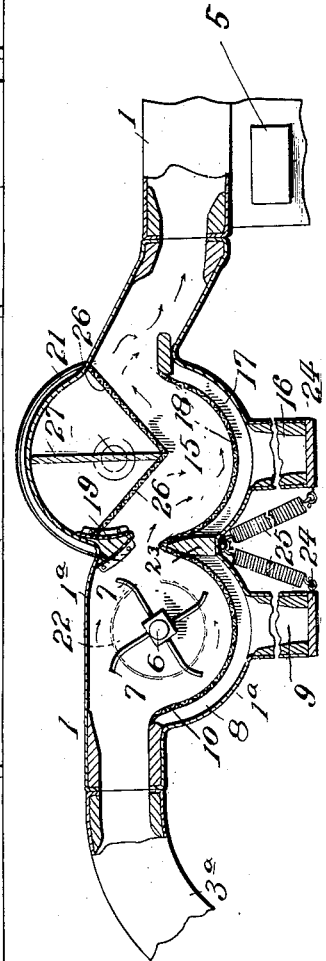

Figure 1 is a view in elevation of a cotton elevating and distributing system of the pneumatic type, the invention being shown applied thereto. Fig. 2 is a vertical longitudinal sectional view of the cleaning mechanism for the distributing system. Fig. 3 is a transverse sectional view on the line X X of Fig. 2. Fig. 4 is a transverse sectional view on the line Y Y of Fig. 2. Fig. 5 is a modification of the invention.

Corresponding and like parts are referred to in the following description and indicated in all the views of the drawings by the same reference characters.

Generally describing the invention and the parts to which the same is applied, the numeral 1 designates the suction conduit or tube through which the cotton passes to the various feeders 2 of the gins 3. The receiving end of the conduit 1 extends downwardly, as shown at $3^a$, and may receive the cotton from wagons or may be directly connected with the cotton-house, according to the various conditions of service. The suction in the conduit 1 is created in the customary manner by exhaust-blast produced by a fan 4. A cleaning mechanism is located, preferably, between the receiving end $3^a$ of the conduit 1 and the discharge chute or flue 5, leading to the feeder of the first gin supplied by the system.

The machine comprising the invention is of such a nature as to be readily connected at its ends with the suction-conduit 1, and said machine embodies a conduit $1^a$, the ends of which will be connected with the conduit 1, as above premised. At the receiving end of the machine is located a beater consisting of a shaft 6 and a plurality of beating-arms 7, extending from the shaft 6. The beater-shaft 6 is approximately in line with the bottom of the conduit $1^a$, and the beater extends upwardly nearly to the top of the conduit, as shown most clearly in Fig. 2 of the drawings. The lower portion of the beater is received in the flared upper extremity 8 of a dirt-box 9, which latter is preferably arranged beneath the beater. At the mouth or upper portion 8 of the box 9 is located a curved partition 10, of foraminous or reticulate material, such as screen or the like, said partition being so located that the beater will force the seed-cotton against the same, permitting dirt and other foreign matter in the cotton to drop through the partition 10 into the bottom of the box 9.

Situated adjacent to the beater before described and also located in the length of the conduit $1^a$ of the machine at the end nearer the gins 3 is the cleaning-drum 11. The drum 11 is composed of a hollow body and a plurality of buckets or flights 12 therein. The drum 11 is mounted upon a shaft 13 and is made of foraminous material, such as screen-cloth similar to the partition 10. The shaft 13 upon which the drum 11 is mounted is disposed approximately on a line with the top of the seed-cotton conduit $1^a$, and the upper portion of the drum extends into a chamber 15, which extends upwardly from the conduit 1ᵃ, the lower portion of the drum extending across the conduit 1ᵃ. A box 16 for dirt and other foreign material is also located beneath the drum 11, the upper portion of said box flaring, as shown at 17, and merging into the bottom of the conduit 1ᵃ, as described with relation to the box 9. The drum 11 is of substantially the same width as the conduit 1ᵃ, and the arrangement of this drum obviates all likelihood of choking of the material as it is forced through the conduit 1ᵃ by suction, said drum at the same time affording the best facilities for driving the dirt and other foreign matter against a second foraminous partition 18, which is disposed above the mouth or upper end of the box 16. A fixed partition 19 projects downwardly from the top of the conduit 1ᵃ between the beater and the drum 11, and said partition 19 deflects the air-current creating the suction in the conduit 1ᵃ downwardly, so that said air-current will not pass over the drum aforesaid, the seed-cotton, with the dirt and foreign matter still retained thereby, being forced downwardly against the partition 18 by the construction of the elements 11 and 19, hereinbefore described. The drum 11 is provided with a plurality of cleaning or picker teeth 20, which project therefrom at the peripheral portion of the said drum, and these teeth 20 may be carried by the several flights 12. The flights 12 prevent the air-current in the conduit 1ᵃ from passing directly through the drum 11, deflecting said current downwardly into the upper portion of the box 16 in a manner clearly apparent. The flights 12 not only perform the function before described, but these parts receive the force of the air-current as it passes through the conduits 1 and 1ᵃ, and such force is sufficient to cause revolution of the drum and shaft 13 upon which it is mounted, said shaft 13 having a pulley 21 thereon exterior of the conduit 1ᵃ, which pulley is preferably, though not necessarily, connected with a second pulley 22, arranged upon the beater-shaft 6. The pulleys 21 and 22 may be connected by a belt, so that said pulleys will cause the shafts 6 and 13 to move in reverse directions and effect reverse movement of the beater and the drum 11. It will thus be noted that the air-current and cotton which passes through the conduit 1ᵃ assist to keep the drum 11 revolving, the latter forcing the cotton downwardly into the upper flared end 17 of the box 16, as above mentioned. The conduit 1ᵃ has a fixed partition 23 projecting from the bottom thereof upwardly between the boxes 9 and 16, and the foraminous partitions 10 and 18 are in spaced relation to the flared upper portions 8 and 17 of the respective boxes aforesaid, permitting the foreign matter passing through said partitions to freely pass into the bottom portions of the boxes.

From the foregoing it will be noted that the arrangement of the beater and the drum 11 is peculiar. The axes of these members are out of line with respect to the air-suction which passes through the suction-conduit, and this arrangement is particularly advantageous, as it effectively obviates likelihood of clogging of the seed-cotton as it is caused to pass through the said conduit. In other words, the axis about which the beater rotates is located in line with or below the bottom of the conduit, whereas the axis of the drum 11 is in line with or above the top of the conduit, and thus as the material which is being cleaned passes through the conduit it is acted upon in the desired manner by the beater and drum, which turning in reverse directions rotate in the direction of movement of the seed-cotton, which is drawn through the conduit by the air-suction therein. There is therefore no tendency on the part of the beater to resist the action of the drum, which is connected therewith, because the operating parts of these members as they act on the material move relatively in the same direction, though the beater and drum rotate in opposite directions, this being due to the arrangement of the said cleaning devices below and above the longitudinal center of the conduit, respectively. As an abutment the drum 11, because of the provision of the flights 12, deflects the air-suction blast downwardly by reason of the solid formation of the flights 12, and this prevents small particles of dirt or foreign matter of any nature from passing through the drum instead of dropping to the dirt-box below. Aside from the above function the flights of course are arranged to be acted upon by the air-suction to assist in turning the drum.

The several boxes 9 and 16 are provided with closures 24 at the lower extremities thereof, and said closures preferably comprise hinged members adapted to automatically operate in discharging the foreign matter in the boxes 9 and 16 therefrom. The closures 24 open downwardly, and each of said closures is normally held closed by means of a spring 25, which spring is preferably of the coil type and is connected at one end with its respective closure, the opposite ends of the springs 25 being connected with the side of the conduit 1ᵃ. When the weight of the contents of the boxes 9 and 16 is such as to overcome the tensions of the springs 25, whereby the closures 24 are held closed, the weight of such contents will force the closures open, discharging the material, after which the springs 25 will automatically close the parts 24 in an evident manner. It will be understood that any suitable means, such as spouts or the like, may direct the material discharged from the boxes 9 and 16 to the conveyer, so that dirt and foreign matter may be carried off to a suitable point of deposit in an economical and advantageous manner. The pulleys 21 and 22 may be connected by a belt, as described before, to be operated thereby, and said pulleys may be actuated by independent connections with a suitable motor, as found best in the actual practice of the invention.

Fig. 5 represents a modified adaptation of the invention, and instead of using the rotating drum 11 the conduit 1ª is provided with a stationary screen or abutment 26 of angular formation. The sides of said abutment diverge toward the upper extremities, being secured at this point to the top of the conduit 1ª in any substantial manner. To reinforce the abutment 26, a vertical division-board 27 may be utilized, said board being arranged between the sides of the conduit 1ª and secured at its sides thereto. The lower extremity of the board 27 may be attached to the lower extremity of the abutment, said board 27 being arranged within the space inclosed by the abutment and bracing the latter, as well as affording a means equivalent to the flights 12 of the drum 11, for deflecting the current of air and cotton passing through the conduit 1ª downwardly as soon as the material reaches the abutment, facilitating the separation of the dirt and foreign matter in virtually the same manner as accomplished in the use of the drum 11. It will be noted that the drum 11 when mounted forms an abutment which accomplishes substantially the same function as the structure 26 just described. The beater-arms 7 are curved at the outer extremities to prevent clogging of the cotton as the same is operated upon by the beater.

In the use of the invention it will be noted that the cotton is drawn from the wagon or cotton-house by the suction through the conduit 1, and before the said cotton reaches the gins the same enters the conduit 1ª of the machine comprising this invention and passes over the partition 10 by the action of the beater-arms 7. Certain of the dirt and foreign matter drops to the box 9 and the material or seed-cotton passes onward through the conduit 1ª to the drum 11, (or the abutment 26, if the latter be used,) being acted upon by the teeth 20 and deflected and forced against the partition 18 of the box 16. From the drum 11 the seed-cotton is forced onward through the conduit 1 by means of the suction, having been thoroughly cleansed and rid of the dirt and foreign matter. The drum 11 of course operates in a reverse direction from the beater used, as hereinbefore mentioned.

Having thus described the invention, what is claimed as new is—

1. In a seed-cotton-cleaning machine, the combination of a suction-conduit, means for creating suction therein, a beater in the length of the conduit and rotatable about an axis out of line with the current of air which passes through said conduit, an abutment also in the length of the conduit and arranged to deflect the current of air passing through the same, and outlets for dirt and foreign matter beneath the beater and the abutment.

2. In a seed-cotton-cleaning machine, the combination of a suction-conduit, means for creating an air-suction therethrough, a cleaner arranged in the length of said conduit, and a member also disposed at a point in the length of the conduit and arranged to be actuated by the current of air passing through the conduit and connected with the aforesaid cleaner.

3. In a seed-cotton-cleaning machine, the combination of a suction-conduit, means for creating an air-suction therethrough, a rotatable beater extending upwardly into the conduit from the bottom thereof with its axis out of line with the air-suction which passes through said conduit, a cleaning-drum forming an abutment extending into the conduit from the top thereof and constructed to deflect the air-current, and outlets for dirt and foreign matter arranged beneath the beater and the abutment.

4. In a seed-cotton-cleaning machine, the combination of a suction-conduit, means for creating an air-suction therethrough, and a revolving cleaning-drum embodying a plurality of flights projecting into the conduit and acted upon by the air-current therein to actuate said drum.

5. In a seed-cotton-cleaning machine, the combination of a suction-conduit, means for creating an air-suction therethrough, a dirt-discharge in the length of the conduit, and a revolving cleaning device projecting into the conduit from the top thereof and rotatable about an axis out of line of the air-current passing through the conduit, said cleaning device embodying a plurality of flights arranged in the path of the air-current.

6. In a seed-cotton-cleaning machine, the combination of a suction-conduit for seed-cotton, means for creating an air-suction through the conduit, a receptacle at the bottom of the conduit to receive material therefrom, a foraminous partition above said receptacle, a drum above said foraminous partition and composed of a body of foraminous material, said drum projecting into the conduit, and means for preventing the suction-current passing through the conduit from passing directly through the drum, whereby the drum is acted upon by the current of air.

7. In a seed-cotton-cleaning machine, the combination of a suction-conduit for seed-cotton, means for creating an air-suction in said conduit, a receptacle at the bottom of the conduit to receive material therefrom, a foraminous partition above said receptacle, a drum above said foraminous partition and composed of a body of foraminous material, said drum projecting into the conduit, flights carried by the drum and located in the path of the air-current passing through the conduit, and a plurality of cleaning-teeth projected from the flights of the drum.

In testimony whereof I affix my signature in presence of two witnesses.

WILLIAM R. LAMB. [L. S.]

Witnesses:
ELIZABETH M. G. LAMB,
RUSSELL G. L. PEPPERELL.